US012700765B2

(12) United States Patent     (10) Patent No.:   US 12,700,765 B2

Hirasawa et al.             (45) Date of Patent:      Aug. 4, 2026

(54) COIL SUBSTRATE, MOTOR COIL SUBSTRATE, AND MOTOR

(71) Applicant: IBIDEN CO., LTD., Ogaki (JP)

(72) Inventors: Takahisa Hirasawa, Ogaki (JP); Takayuki Furuno, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 195 days.

(21) Appl. No.: 18/581,985

(22) Filed: Feb. 20, 2024

(65) Prior Publication Data

US 2024/0195252 A1     Jun. 13, 2024

Related U.S. Application Data

(63) Continuation of application No. PCT/JP2022/031047, filed on Aug. 17, 2022.

(30) Foreign Application Priority Data

Aug. 24, 2021    (JP) .................................. 2021-136207

(51) Int. Cl.
*H02K 3/26*       (2006.01)

(52) U.S. Cl.
CPC ........... *H02K 3/26* (2013.01); *H02K 2203/03* (2013.01)

(58) Field of Classification Search
CPC .............................. H02K 3/26; H02K 2203/03
See application file for complete search history.

(56) References Cited

U.S. PATENT DOCUMENTS

| | | | |
|---|---|---|---|
| 10,461,596 B2 | 10/2019 | Dehez et al. | |
| 2011/0140564 A1 * | 6/2011 | Nomura ................ | H01F 41/041 336/200 |
| 2020/0280233 A1 * | 9/2020 | Dehez ................. | H01F 27/2804 |

FOREIGN PATENT DOCUMENTS

| | | |
|---|---|---|
| CN | 107394932 A | 11/2017 |
| JP | 2014-512169 A | 5/2014 |
| JP | 2020-061532 A | 4/2020 |
| JP | 2020072551 A * | 5/2020 |
| JP | 2020-114139 A | 7/2020 |

(Continued)

OTHER PUBLICATIONS

Extended European Search Report mailed Jul. 30, 2025 in corresponding European Application No. 22861204.0 (11 pages).

(Continued)

*Primary Examiner* — Viet P Nguyen

(74) *Attorney, Agent, or Firm* — Finnegan, Henderson, Farabow, Garrett & Dunner, LLP

(57) ABSTRACT

A coil substrate includes a flexible substrate, and coils formed on the flexible substrate such that each of the coils includes wirings formed on the first surface of the flexible substrate and wirings formed on the second surface of the flexible substrate. The coils include an N-th coil forming an N-th phase and an (N+1)-th coil formed adjacent to the N-th coil and forming an (N+1)-th phase different from the N-th phase, and each coil is formed such that an inter-wiring distance between the wirings forming the N-th coil and the wirings forming the (N+1)-th coil is larger than an inter-wiring distance between the wirings forming the N-th coil, and the inter-wiring distance between the wirings forming the N-th coil and the wirings forming the (N+1)-th coil is larger than an inter-wiring distance between the wirings forming the (N+1)-th coil.

20 Claims, 5 Drawing Sheets

(56)         References Cited

FOREIGN PATENT DOCUMENTS

| | | |
|---|---|---|
| JP | 2021-048718 A | 3/2021 |
| JP | 2022-043581 A | 3/2022 |

OTHER PUBLICATIONS

Japanese Office Action dated Oct. 28, 2025, issued in Japanese Patent Application No. 2021-136207 (8 pages).
International Preliminary Report on Patentability issued Feb. 27, 2024 in PCT/JP2022/031047 filed Aug. 17, 2022, 5 pages, documents cited therein have been previously submitted.
International Search Report issued Nov. 8, 2022, in PCT/JP2022/031047 filed Aug. 17, 2022, 5 pages.
Notice of Reasons for Refusal issued in Japanese Patent Application No. 2021-136207 on Mar. 31, 2026 (7 pages).

* cited by examiner

COIL SUBSTRATE, MOTOR COIL SUBSTRATE, AND MOTOR

CROSS-REFERENCE TO RELATED APPLICATIONS

The present application is a continuation of and claims the benefit of priority to International Application No. PCT/JP2022/031047, filed Aug. 17, 2022, which is based upon and claims the benefit of priority to Japanese Application No. 2021-136207, filed Aug. 24, 2021. The entire contents of these applications are incorporated herein by reference.

BACKGROUND OF THE INVENTION

Field of the Invention

The present invention relates to a coil substrate, a motor coil substrate formed using the coil substrate, and a motor formed using the motor coil substrate.

Description of Background Art

Japanese Patent Application Laid-Open Publication No. 2020-61532 describes a coil substrate having a flexible substrate and spiral-shaped wirings formed on both sides of the flexible substrate. The entire contents of this publication are incorporated herein by reference.

SUMMARY OF THE INVENTION

According to one aspect of the present invention, a coil substrate includes a flexible substrate having a first surface and a second surface on the opposite side with respect to the first surface, and coils formed on the flexible substrate such that each of the coils includes wirings formed on the first surface of the flexible substrate and wirings formed on the second surface of the flexible substrate. The coils include an N-th coil forming an N-th phase and an (N+1)-th coil formed adjacent to the N-th coil and forming an (N+1)-th phase different from the N-th phase, and each of the coils is formed such that an inter-wiring distance between the wirings forming the N-th coil and the wirings forming the (N+1)-th coil is larger than an inter-wiring distance between the wirings forming the N-th coil and that the inter-wiring distance between the wirings forming the N-th coil and the wirings forming the (N+1)-th coil is larger than an inter-wiring distance between the wirings forming the (N+1)-th coil.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
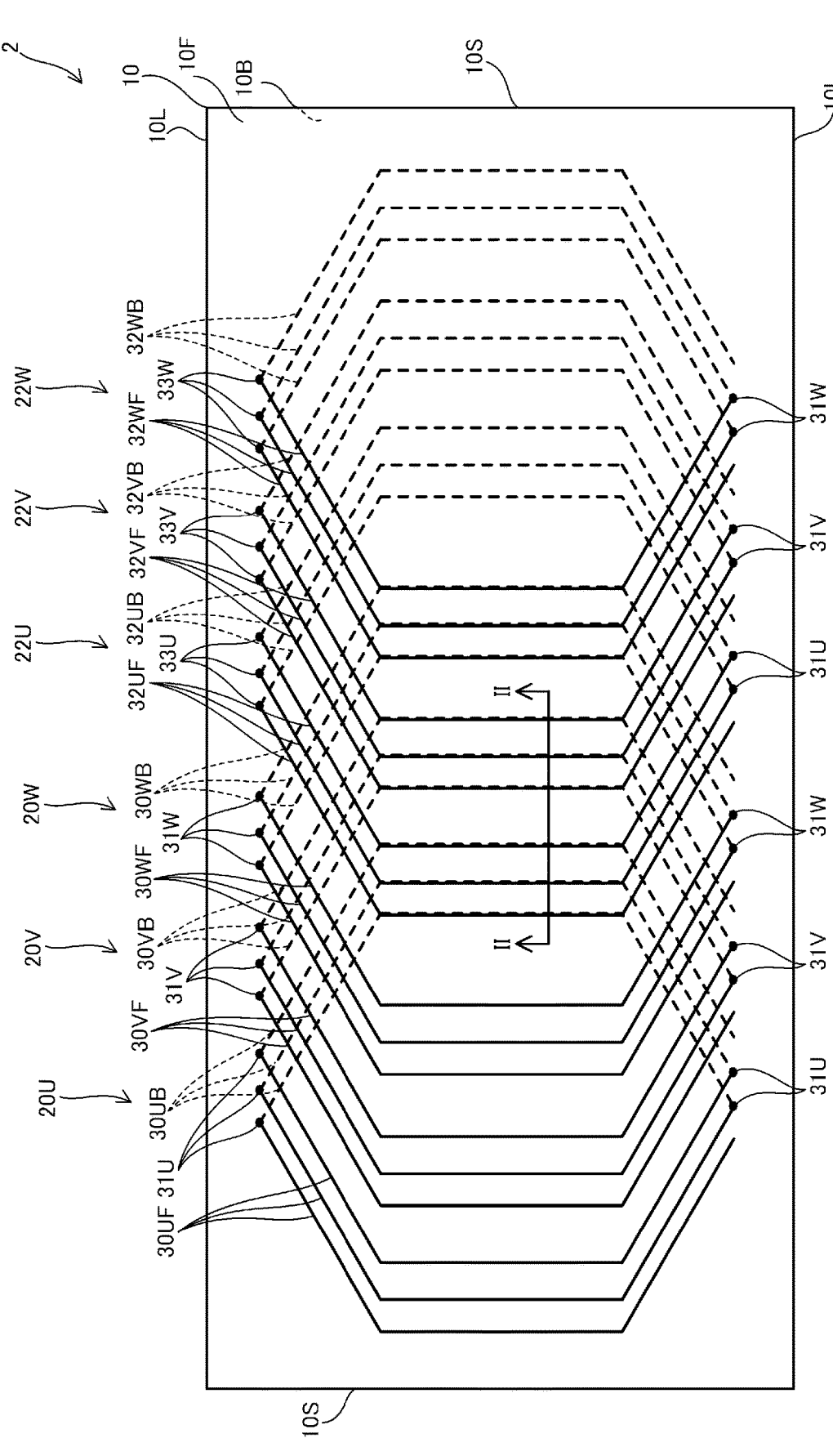
FIG. 1 is a plan view schematically illustrating a coil substrate according to an embodiment of the present invention.

Embodiments will now be described with reference to the accompanying drawings, wherein like reference numerals designate corresponding or identical elements throughout the various drawings.

EMBODIMENT

FIG. 1 is a plan view illustrating a coil substrate 2 of an embodiment. The coil substrate 2 has a flexible substrate 10 and multiple coils (20U, 20V, 20W, 22U, 22V, 22W). The coil substrate 2 is a coil substrate for a three-phase motor. The coils (20U, 22U) form a U phase. The coils (20V, 22V) form a V phase. The coils (20W, 22W) form a W phase.

The flexible substrate 10 is a resin substrate having a first surface (10F) and a second surface (10B) on the opposite side with respect to the first surface (10F). The flexible substrate 10 is formed using an insulating resin such as polyimide or polyamide. The flexible substrate 10 is flexible. The flexible substrate 10 is formed in a rectangular shape having short sides (10S) and long sides (10L). As will be described in detail later, when the coil substrate 2 is wound into a cylindrical shape to form a motor coil substrate 50 (see FIG. 3), the first surface (10F) is positioned on an inner peripheral side and the second surface (10B) is positioned on an outer peripheral side.

The coils (20U, 20V, 20W, 22U, 22V, 22W) are formed along the long sides (10L) of the flexible substrate 10. As described above, the coils (20U, 22U) form a U phase. The coils (20V, 22V) form a V phase. The coils (20W, 22W) form a W phase. The V-phase coils (20V, 22V) are formed adjacent to the U-phase coils (20U, 22U). The W-phase coils (20W, 22W) are formed adjacent to the V-phase coils (20V, 22V). In the embodiment, the flexible substrate 10 is provided with six coils (20U, 20V, 20W, 22U, 22V, 22W) (that is, two sets of three-phase coils). However, in a modified example, the flexible substrate 10 may be provided with 3X (where X is an integer of 1 or 3 or more) coils (that is, one set or three or more sets of three-phase coils).

The coil (20U) is formed by that a first wiring (30UF) forming a half turn of one turn is formed on the first surface (10F) side, a second wiring (30UB) forming the remaining half turn is formed on the second surface (10B) side, and adjacent turns are formed in a staggered manner. In FIG. 1, the coil (20U) has wirings for three turns. The first wiring (30UF) and the second wiring (30UB) that form each turn are electrically connected via a via conductor (31U) penetrating the flexible substrate 10.

Similarly, the coil (20V) is formed by that a first wiring (30VF) forming a half turn of one turn is formed on the first surface (10F) side, a second wiring (30VB) forming the remaining half turn is formed on the second surface (10B)

side, and adjacent turns are formed in a staggered manner. The coil (20V) has wirings for three turns. The first wiring (30VF) and the second wiring (30VB) that form each turn are electrically connected via a via conductor (31V). The coil (20W) is formed by that a first wiring (30WF) forming a half turn of one turn is formed on the first surface (10F) side, a second wiring (30WB) forming the remaining half turn is formed on the second surface (10B) side, and adjacent turns are formed in a staggered manner. The coil (20W) has wirings for three turns. The first wiring (30WF) and the second wiring (30WB) that form each turn are electrically connected via a via conductor (31W).

Structures of the coils (22U, 22V, 22W) are similar to those of the coils (20U, 20V, 20W) described above. The coil (22U) is formed by first wirings (32UF), second wirings (32UB), and via conductors (33U). The coil (22V) is formed by first wirings (32VF), second wirings (32VB), and via conductors (33V). The coil (22W) is formed by first wirings (32WF), second wirings (32WB), and via conductors (33W).

Portions of the second wirings (30UB) of the coil (20U) respectively overlap with portions of the first wirings (32UF) of the U-phase coil (22U) of the adjacent set via the flexible substrate 10. Portions of the second wirings (30VB) of the coil (20V) respectively overlap with portions of the first wirings (32VF) of the V-phase coil (22V) of the adjacent set via the flexible substrate 10. Portions of the second wirings (30WB) of the coil (20W) respectively overlap with portions of the first wirings (32WF) of the W-phase coil (22W) of the adjacent set via the flexible substrate 10. The arrangement in FIG. 1 is an example. In other modified examples, it is also possible that portions of the second wirings (30UB, 30VB, 30WB) forming the coils (20U, 20V, 20W) do not need to respectively overlap with portions of the first wirings (32UF, 32VF, 32WF) forming the coils (22U, 22V, 22W).

Although not illustrated, the first surface (10F) and the first wirings (30UF, 30VF, 30WF, 32UF, 32VF, 32WF) are covered with a resin insulation layer. Similarly, the second surface (10B) and the second wirings (30UB, 30VB, 30WB, 32UB, 32VB, 32WB) are covered with a resin insulation layer.

Figure 2:
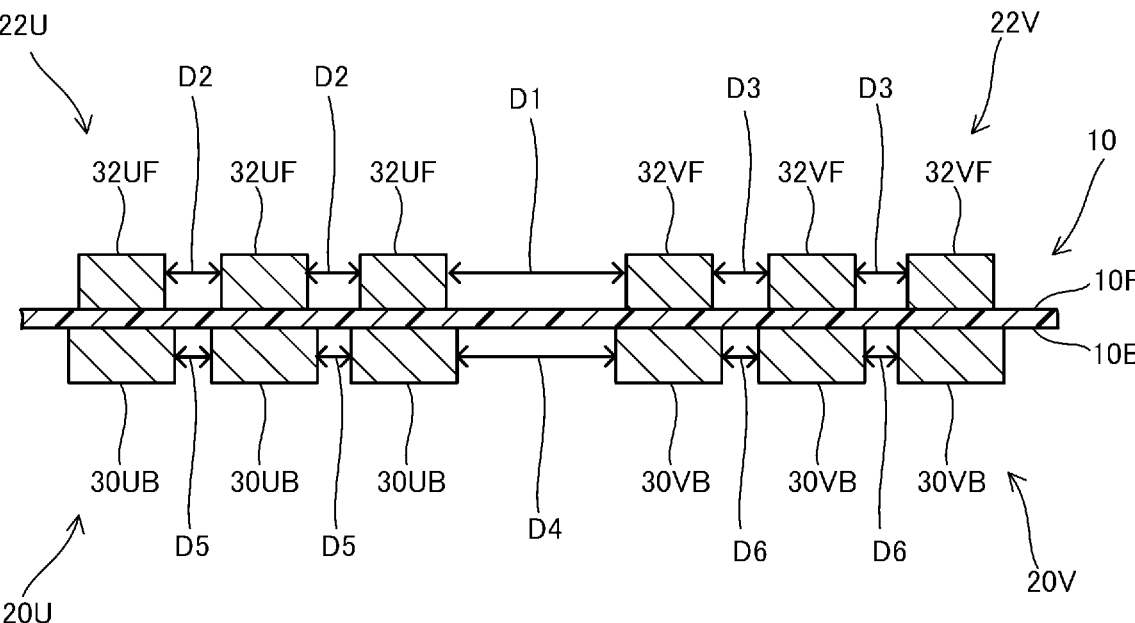
FIG. 2 is a cross-sectional view schematically illustrating a portion of a coil substrate according to an embodiment of the present invention.

FIG. 2 is a cross-sectional view of a portion of the coil substrate 2 of the embodiment. FIG. 2 is a cross-sectional view between II-II of FIG. 1. As illustrated in FIG. 2, on the first surface (10F) side, an inter-wiring distance (D1) between the first wirings (32UF) forming the U-phase coil (22U) and the first wirings (32VF) forming the V-phase coil (22V) is larger than an inter-wiring distance (D2) between the first wirings (32UF) forming the coil (22U) and an inter-wiring distance (D3) between the first wirings (32VF) forming the coil (22V). The inter-wiring distance (D2) and the inter-wiring distance (D3) are substantially the same. However, a difference depending on positions when the coil substrate 2 is wound into a cylindrical shape may be provided.

Similarly, on the second surface (10B) side, an inter-wiring distance (D4) between the second wirings (30UB) forming the U-phase coil (20U) and the second wirings (30VB) forming the V-phase coil (20V) is larger than an inter-wiring distance (D5) between the second wirings (30UB) forming the coil (20U) and an inter-wiring distance (D6) between the second wirings (30VB) forming the coil (20V). The inter-wiring distance (D5) and the inter-wiring distance (D6) are substantially the same. However, a difference depending on positions when the coil substrate 2 is wound into a cylindrical shape may be provided.

Further, the inter-wiring distance (D2) is larger than the inter-wiring distance (D5). The inter-wiring distance (D3) is larger than the inter-wiring distance (D6). A width of each of the first wirings (32UF, 32VF) is smaller than a width of each of the second wirings (30UB, 30VB). Therefore, the inter-wiring distance (D1) is larger than the inter-wiring distance (D4).

In the example of FIG. 2, a relationship between the coil (20U) (U-phase) and the coil (20V) (V-phase) and a relationship between the coil (22U) (U-phase) and the coil (22V) (V-phase) are described. However, a relationship between adjacent coils of different phases (a relationship between the coil (20V) (V phase) and the coil (20W) (W phase), a relationship between the coil (20W) (W phase) and the coil (22U) (U phase) of the adjacent set, or the like) is also similar to the relationships described with reference to FIG. 2.

Figure 3:
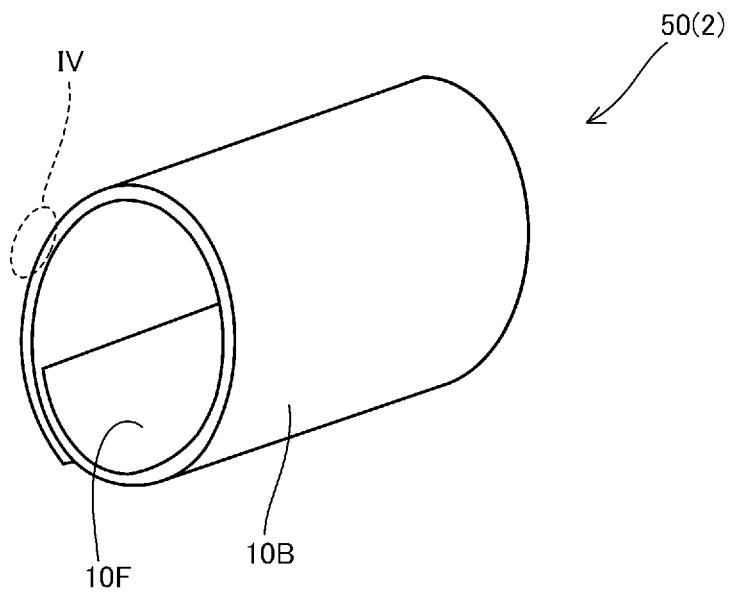
FIG. 3 is a perspective view schematically illustrating a motor coil substrate according to an embodiment of the present invention.

FIG. 3 is a perspective view schematically illustrating the motor coil substrate 50 formed using the coil substrate 2 of the embodiment (FIGS. 1 and 2). As illustrated in FIG. 3, the motor coil substrate 50 for a motor is formed by winding the coil substrate 2 of the embodiment (FIGS. 1 and 2) into a cylindrical shape. When the coil substrate 2 is wound into a cylindrical shape, with one end side of the long sides (10L) (FIG. 1) as a starting point, the coil substrate 2 is wound in a circumferential direction around an axis parallel to the short side (10S) on the one end side. The coil substrate 2 is wound in multiple turns. When the coil substrate 2 is wound into a cylindrical shape, the first surface (10F) is positioned on an inner peripheral side and the second surface (10B) is positioned on an outer peripheral side.

Figure 4:
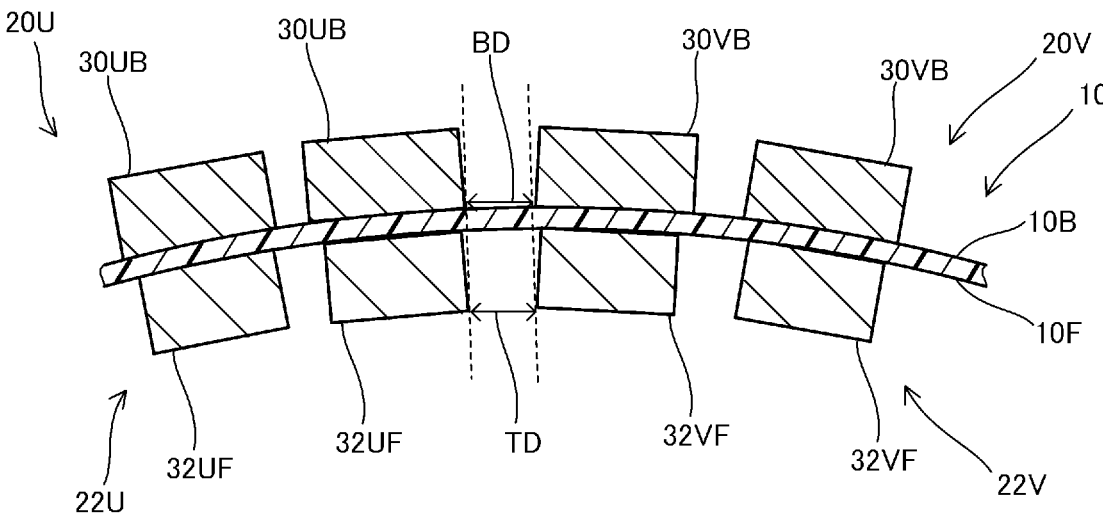
FIG. 4 is an enlarged explanatory diagram of a portion of FIG. 3.

FIG. 4 is an enlarged explanatory diagram of a portion (IV) of FIG. 3. As illustrated in FIG. 4, a distance (TD) between top portions of the first wirings (32UF) of the coil (22U) and the first wirings (32VF) of the coil (22V) positioned on the inner peripheral side is substantially equal to a distance (BD) between bottom portions of the second wirings (30UB) of the coil (20U) and the second wirings (30VB) of the coil (20V) positioned on the outer peripheral side. The top portions of the first wirings (32UF, 32VF) are highest portions of the first wirings (32UF, 32VF) from the first surface (10F). The bottom portions of the second wirings (30UB, 30VB) are portions of the second wirings (30UB, 30VB) that are in contact with the second surface (10B). The distances (TD, BD) are each, for example, 10 μm or more and 50 μm or less (preferably 15 μm or more and 30 μm or less).

Figure 5:
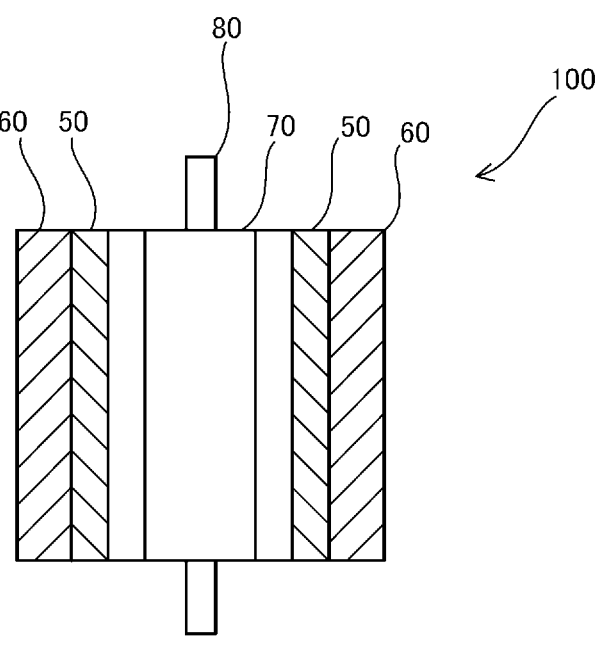
FIG. 5 is a cross-sectional view schematically illustrating a motor according to an embodiment of the present invention.

FIG. 5 is a cross-sectional view schematically illustrating a motor 100 formed using the motor coil substrate 50 of the embodiment (FIGS. 3 and 4). The motor 100 is formed by positioning the motor coil substrate 50 on an inner side of a yoke 60 and positioning a rotation shaft 80 and a magnet 70 fixed to the rotation shaft 80 on an inner side of the motor coil substrate 50.

In the above, the structures of the coil substrate 2 (FIGS. 1 and 2), the motor coil substrate 50 (FIGS. 3 and 4), and the motor 100 (FIG. 5) of the embodiment have been described. As illustrated in FIG. 2, in the coil substrate 2 of the embodiment, the inter-wiring distance (D1) between the first wirings (32UF) forming the U-phase coil (22U) and the first wirings (32VF) forming the V-phase coil (22V) is larger than the inter-wiring distance (D2) between the first wirings (32UF) forming the coil (22U) and the inter-wiring distance (D3) between the first wirings (32VF) forming the coil (22V). The inter-wiring distance (D4) between the second wirings (30UB) forming the U-phase coil (20U) and the second wirings (30VB) forming the V-phase coil (20V) is larger than the inter-wiring distance (D5) between the second wirings (30UB) forming the coil (20U) and the inter-wiring distance (D6) between the second wirings (30VB) forming the coil (20V). Therefore, when the motor coil substrate 50 is formed using the coil substrate 2 of the embodiment (FIGS. 3 and 4), on the first surface (10F) on the inner peripheral side, the distance between the first wirings (32UF) forming the coil (22U) and the first wirings (32VF) forming the adjacent coil (22V) is maintained so that the wirings do not come into contact with each other. Similarly, also on the second surface (10B) on the outer peripheral side, the distance between the second wirings (30UB) forming the coil (20U) and the second wirings (30VB) forming the adjacent coil (20V) is maintained. When the motor 100 is formed using the coil substrate 2 having multiple-phase (specifically three-phase) coils, a withstand voltage of the motor 100 is ensured, and a motor 100 with stable performance is obtained.

The coil (20U) and the coil (20V) in FIG. 2, and the coil (22U) and the coil (22V) in FIG. 2 are examples of an "N-th coil" and an "(N+1)-th coil". The inter-wiring distances (D1, D4) are examples of "an inter-wiring distance between wirings forming an N-th coil and wirings forming an (N+1)-th coil". The inter-wiring distances (D2, D5) are examples of an "inter-wiring distance between wirings forming an N-th coil." The inter-wiring distances (D3, D6) are examples of an "inter-wiring distance between wirings forming an (N+1)-th coil."

First Alternative Example

In a first alternative example of the embodiment, the width of each of the first wirings (32UF, 32VF) is substantially equal to the width of each of the second wirings (30UB, 30VB). The inter-wiring distance (D2) is equal to the inter-wiring distance (D5). The inter-wiring distance (D3) is equal to the inter-wiring distance (D6). Even in this case, the inter-wiring distance (D1) is larger than the inter-wiring distances (D2, D3). The inter-wiring distance (D4) is larger than the inter-wiring distances (D5, D6). The inter-wiring distance (D1) may be larger than the inter-wiring distance (D4) or may be equal to the inter-wiring distance (D4).

Second Alternative Example

In a second alternative example of the embodiment, the coil substrate 2 includes multiple-phase coils of four or more phases. In this case, an inter-wiring distance between wirings forming an N-th coil of an N-th phase (N=1, 2, . . . ) and wirings forming an (N+1)-th coil of an (N+1)-th phase is larger than an inter-wiring distance between wirings forming the N-th coil and an inter-wiring distance between wirings forming the (N+1)-th coil.

First Modified Example

Figure 6:
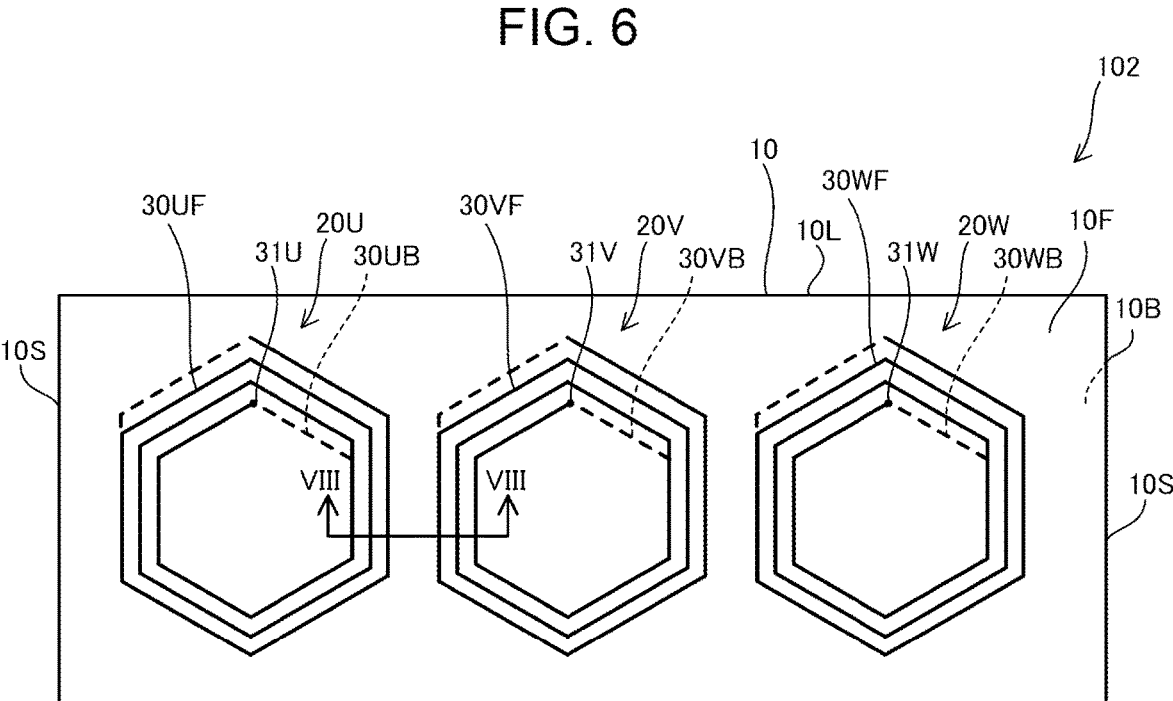
FIG. 6 is a plan view schematically illustrating a coil substrate of a first modified example according to an embodiment of the present invention.
Figure 7:
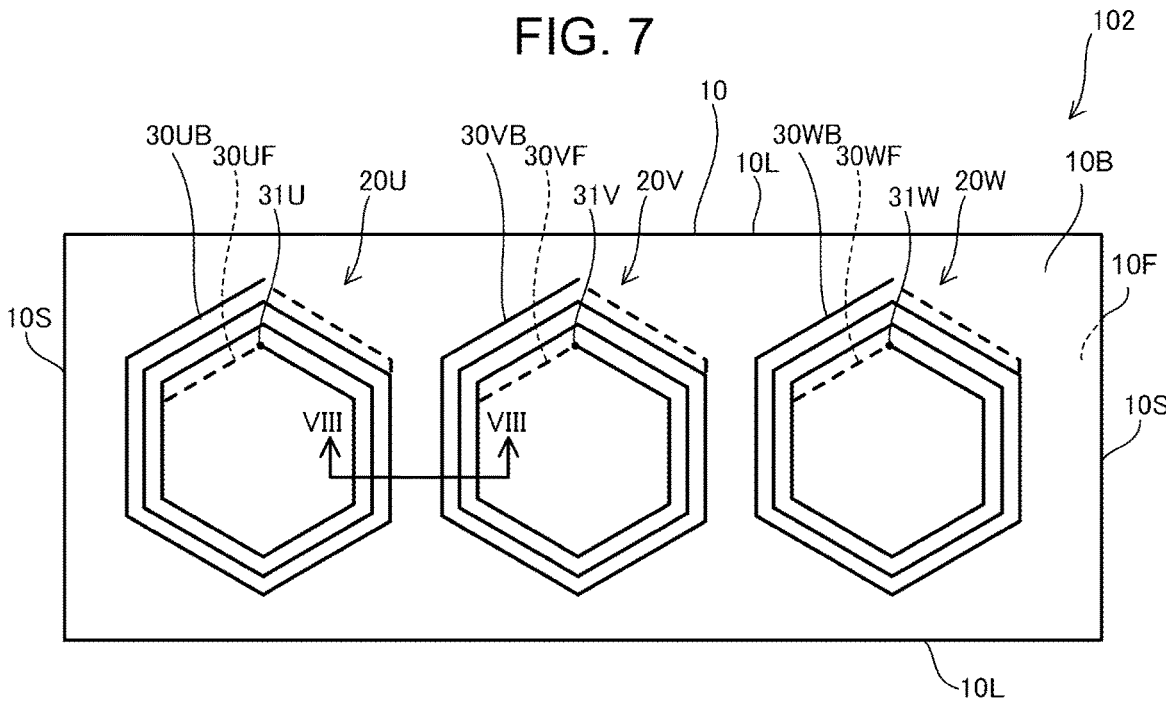
FIG. 7 is a bottom view schematically illustrating the coil substrate of the first modified example.
Figure 8:
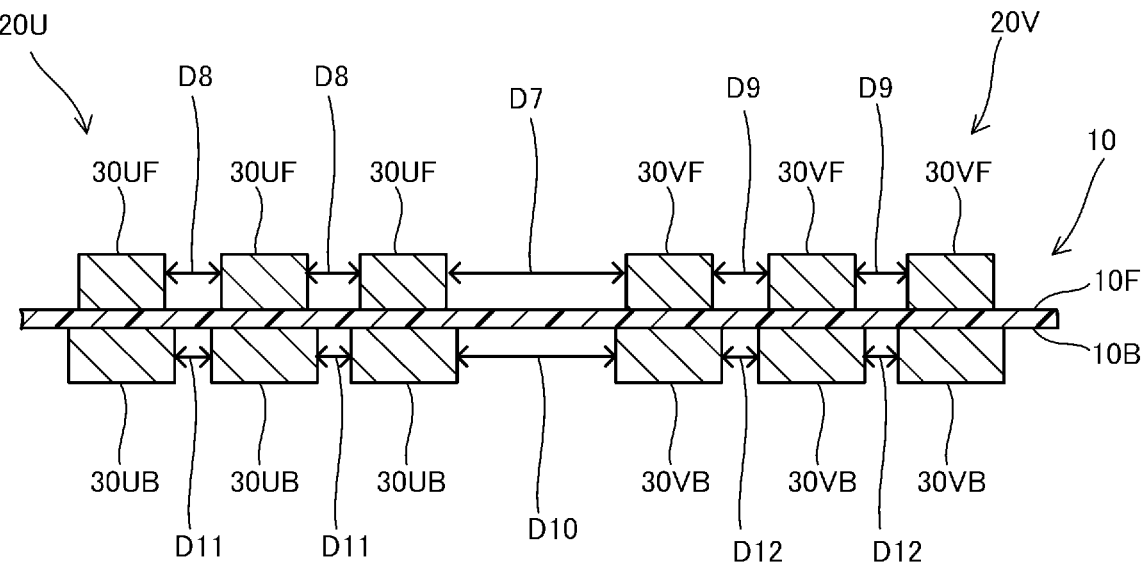
FIG. 8 is a cross-sectional view schematically illustrating a portion of the coil substrate of the first modified example.

FIGS. 6-8 illustrate a first modified example of the embodiment. In the first modified example, arrangement of wirings forming coils (20U, 20V, 20W) is different from that in the embodiment. FIG. 6 is a plan view illustrating a coil substrate 102 of the first modified example. FIG. 7 is a bottom view illustrating the coil substrate 102 of the first modified example. In the first modified example, as illustrated in FIGS. 6 and 7, one set of three-phase coils (20U, 20V, 20W) is provided on the flexible substrate 10. In other examples, 3Y (Y being an integer of 2 or more) coils (that is, two or more sets of three-phase coils) may be provided on the flexible substrate 10.

The coil (20U) forming a U phase is formed of a coil-shaped first wiring (30UF) provided on the first surface (10F) (FIG. 6) and a coil-shaped second wiring (30UB) provided on the second surface (10B) (FIG. 7). The first wiring (30UF) and the second wiring (30UB) are electrically connected via a via conductor (31U) penetrating the flexible substrate 10. Similarly, the coil (20V) forming a V phase is formed of a first wiring (30VF) and a second wiring (30VB). The first wiring (30VF) and the second wiring (30VB) are electrically connected via a via conductor (31V). The coil (20W) forming a W phase is formed of a first wiring (30WF) and a second wiring (30WB). The first wiring (30WF) and the second wiring (30WB) are electrically connected via a via conductor (31W).

As illustrated in FIG. 6, the first wiring (30UF) is formed in a clockwise spiral shape (hexagonal spiral shape) from an outer periphery toward an inner periphery. The via conductor (31U) is formed at an inner peripheral side end of the first wiring (30UF). As illustrated in FIG. 7, the second wiring (30UB) is formed in a counterclockwise spiral shape (hexagonal spiral shape) from an outer periphery toward an inner periphery. The via conductor (31U) is formed at an inner peripheral side end of the second wiring (30UB). The first wiring (30UF) and the second wiring (30UB) are formed in spiral shapes wound in the same direction when viewed from the same surface. The first wiring (30UF) and the second wiring (30UB) are electrically connected in series and function as one coil (20U).

The first wiring (30VF) and the second wiring (30VB), as well as the first wiring (30WF) and the second wiring (30WB), have the same relationship as the first wiring (30UF) and the second wiring (30UB) described above. The first wiring (30VF) and the second wiring (30VB) are formed in spiral shapes wound in the same direction when viewed from the same surface. The first wiring (30VF) and the second wiring (30VB) are electrically connected in series and function as one coil (20V). The first wiring (30WF) and the second wiring (30WB) are formed in spiral shapes wound in the same direction when viewed from the same surface. The first wiring (30WF) and the second wiring (30WB) are electrically connected in series and function as one coil (20W).

Although not illustrated, the first surface (10F) and the first wirings (30UF, 30VF, 30WF) are covered with a resin insulation layer. Similarly, the second surface (10B) and the second wirings (30UB, 30VB, 30WB) are covered with a resin insulation layer.

FIG. 8 is a cross-sectional view of a portion of the coil substrate 102. FIG. 8 is a cross-sectional view between VIII-VIII of FIGS. 6 and 7. With reference to FIG. 8, a relationship between the coil (20U) (the first wiring (30UF) and the second wiring (30UB)) and the coil (20V) (the first wiring (30VF) and the second wiring (30VB)) is described in detail. FIG. 8 illustrates a cross-sectional view of portions of the coil (20U) and the coil (20V). The coil (20V) and the coil (20W) have a similar relationship.

As illustrated in FIG. 8, the first wiring (30UF) on the first surface (10F) and the second wiring (30UB) on the second surface (10B) overlap each other via the flexible substrate 10 in a thickness direction (vertical direction in the drawing). The first wiring (30VF) on the first surface (10F) and the second wiring (30VB) on the second surface (10B) overlap in the thickness direction via the flexible substrate 10.

On the first surface (10F) side, an inter-wiring distance (D7) between the first wiring (30UF) forming the U-phase coil (20U) and the first wiring (30VF) forming the V-phase coil (20V) is larger than an inter-wiring distance (D8) between first wirings (30UF) forming the coil (20U) and an inter-wiring distance (D9) between first wirings (30VF) forming the coil (20V). The inter-wiring distance (D8) and the inter-wiring distance (D9) are substantially the same. However, a difference depending on positions when the coil substrate 2 is wound into a cylindrical shape may be provided.

Similarly, on the second surface (10B) side, an inter-wiring distance (D10) between the second wiring (30UB) forming the U-phase coil (20U) and the second wiring (30VB) forming the V-phase coil (20V) is larger than an inter-wiring distance (D11) between second wirings (30UB) forming the coil (20U) and an inter-wiring distance (D12) between second wirings (30VB) forming the coil (20V). The inter-wiring distance (D11) and the inter-wiring distance (D12) are substantially the same. However, a difference depending on positions when the coil substrate 2 is wound into a cylindrical shape may be provided.

Further, the inter-wiring distance (D8) is larger than the inter-wiring distance (D11). The inter-wiring distance (D9) is larger than the inter-wiring distance (D12). A width of each of the first wirings (30UF, 30VF) is smaller than a width of each of the second wirings (30UB, 30VB). Therefore, the inter-wiring distance (D7) is larger than the inter-wiring distance (D10).

When the coil substrate 102 of the first modified example (FIGS. 6-8) is used to form the motor coil substrate 50 (FIGS. 3 and 4), on the first surface (10F) on the inner peripheral side, the distance between the first wiring (30UF) forming the coil (20U) and the first wiring (30VF) forming the adjacent coil (20V) is maintained. Similarly, also on the second surface (10B) on the outer peripheral side, the distance between the second wiring (30UB) forming the coil (20U) and the second wiring (30VB) forming the adjacent coil (20V) is maintained. When the motor 100 is formed using the coil substrate 102 having multiple-phase (specifically three-phase) coils, the withstand voltage of the motor 100 is ensured, and a motor 100 with stable performance is obtained.

First Alternative Example

In a first alternative example of the first modified example, the width of each of the first wirings (30UF, 30VF) in FIG. 8 is substantially equal to the width of each of the second wirings (30UB, 30VB). The inter-wiring distance (D8) is equal to the inter-wiring distance (D11). The inter-wiring distance (D9) is equal to the inter-wiring distance (D12). Even in this case, the inter-wiring distance (D7) is larger than the inter-wiring distances (D8, D9). The inter-wiring distance (D10) is larger than the inter-wiring distances (D11, D12). The inter-wiring distance (D7) may be larger than the inter-wiring distance (D10) or may be equal to the inter-wiring distance (D10).

Second Alternative Example

In a second alternative example of the first modified example, the coil substrate 102 includes multiple-phase coils of four or more phases. In this case, an inter-wiring distance between a wiring forming an N-th coil of an N-th phase (N=1, 2, . . . ) and a wiring forming an (N+1)-th coil of an (N+1)-th phase is larger than an inter-wiring distance between wirings forming the N-th coil and an inter-wiring distance between wirings forming the (N+1)-th coil.

Japanese Patent Application Laid-Open Publication No. 2020-61532 describes a coil substrate having a flexible substrate and spiral-shaped wirings formed on both sides of the flexible substrate. A motor coil substrate is formed by winding the coil substrate into a cylindrical shape. A motor is formed by positioning the formed motor coil substrate on an inner side of a cylindrical yoke and positioning a rotation shaft and a magnet on an inner side of the motor coil substrate.

The coil substrate of Japanese Patent Application Laid-Open Publication No. 2020-61532 may have multiple coils forming three phases including a U phase, a V phase, and a W phase. In that case, when the coil substrate is wound into a cylindrical shape, it is thought that the wirings of two adjacent coils forming different phases may come close to each other. When a high voltage is applied, it is thought that a short circuit may occur between the wirings of two adjacent coils forming different phases.

A coil substrate according to an embodiment of the present invention includes: a flexible substrate that has a first surface and a second surface on the opposite side with respect to the first surface; and multiple coils that are each formed by coil-shaped wirings provided on the first surface and coil-shaped wirings provided on the second surface. The multiple coils include an N-th coil forming an N-th phase (N=1, 2 . . . ) and an (N+1)-th coil forming an (N+1)-th phase different from the N-th phase, and the (N+1)-th coil is formed adjacent to the N-th coil. An inter-wiring distance between the wirings forming the N-th coil and the wirings forming the (N+1)-th coil is larger than an inter-wiring distance between the wirings forming the N-th coil and an inter-wiring distance between the wirings forming the (N+1)-th coil.

In a coil substrate according to an embodiment of the present invention, the inter-wiring distance between the wirings forming the N-th coil and the wirings forming the (N+1)-th coil is larger than the inter-wiring distance between the wirings forming the N-th coil and the inter-wiring distance between the wirings forming the (N+1)-th coil. Therefore, when the coil substrate is wound into a cylindrical shape to form the motor coil substrate, a distance between the wirings forming the N-th coil and the wirings forming the adjacent (N+1)-th coil is maintained, and the wirings do not come into contact with each other. Even when a high voltage is applied, occurrence of a short circuit between the N-th phase and the (N+1)-th phase is suppressed. When a motor is formed using the coil substrate having the multiple-phase coils, a withstand voltage of the motor is ensured, and a motor with stable performance is obtained.

A motor coil substrate according to an embodiment of the present invention is formed by winding an above coil substrate according to an embodiment of the present invention into a cylindrical shape. The first surface is formed on an inner peripheral side, and the second surface is formed on an outer peripheral side.

In a motor coil substrate according to an embodiment of the present invention, as described above, a distance between the wirings forming the N-th coil and the wirings forming the adjacent (N+1)-th coil is maintained, and the wirings do not come into contact with each other. Even when a high voltage is applied, occurrence of a short circuit between the N-th phase and the (N+1)-th phase is suppressed. When a motor is formed using the motor coil substrate, a withstand voltage of the motor is ensured, and a motor with stable performance is obtained.

A motor according to an embodiment of the present invention is formed by positioning an above motor coil substrate according to an embodiment of the present invention on an inner side of a cylindrical yoke and positioning a rotation shaft and a magnet on an inner side of the motor coil substrate.

In a motor according to an embodiment of the present invention, even when a high voltage is applied, occurrence of a short circuit between the N-th phase and the (N+1)-th phase is suppressed. A withstand voltage of the motor is ensured, and a motor with stable performance is obtained.

Obviously, numerous modifications and variations of the present invention are possible in light of the above teachings. It is therefore to be understood that within the scope of the appended claims, the invention may be practiced otherwise than as specifically described herein.

The invention claimed is:

1. A coil substrate, comprising:
a flexible substrate having a first surface and a second surface on an opposite side with respect to the first surface; and
a plurality of coils formed on the flexible substrate such that each of the coils includes a plurality of wirings formed on the first surface of the flexible substrate and a plurality of wirings formed on the second surface of the flexible substrate,
wherein the plurality of coils includes an N-th coil forming an N-th phase and an (N+1)-th coil formed adjacent to the N-th coil and forming an (N+1)-th phase different from the N-th phase, and each of the coils is formed such that an inter-wiring distance between the wirings forming the N-th coil and the wirings forming the (N+1)-th coil is larger than an inter-wiring distance between the wirings forming the N-th coil, that the inter-wiring distance between the wirings forming the N-th coil and the wirings forming the (N+1)-th coil is larger than an inter-wiring distance between the wirings forming the (N+1)-th coil and that the inter-wiring distance between the wirings forming the N-th coil and the wirings forming the (N+1)-th coil on the first surface of the flexible substrate is larger than the inter-wiring distance between the wirings forming the N-th coil and the wirings forming the (N+1)-th coil on the second surface of the flexible substrate.

2. The coil substrate according to claim 1, wherein the plurality of coils is formed such that each of the coils includes a half-turn wiring formed on the first surface of the flexible substrate, a half-turn wiring formed on the second surface of the flexible substrate, and a via conductor penetrating through the flexible substrate and connecting the half-turn wiring on the first surface of the flexible substrate and the half-turn wiring on the second surface of the flexible substrate.

3. A motor coil substrate, comprising:
the coil substrate of claim 2 wound into a cylindrical shape such that the first surface of the flexible substrate is positioned on an inner peripheral side of the cylindrical shape and that the second surface of the flexible substrate is positioned on an outer peripheral side of the cylindrical shape.

4. A motor, comprising:
a cylindrical yoke;
the motor coil substrate of claim 3 positioned on an inner side of the cylindrical yoke;

a rotation shaft positioned on an inner side of the motor coil substrate; and
a magnet fixed on the rotation shaft on the inner side of the motor coil substrate.

5. The coil substrate according to claim 2, wherein the flexible substrate includes an insulating resin substrate having a rectangular shape such that the coils are formed along a long side of the rectangular shape of the insulating resin substrate.

6. The coil substrate according to claim 5, wherein the plurality of coils includes a coil configured to form a U phase, a coil configured to form a V phase, and a coil configured to form a W phase such that the plurality of coils is configured to form a coil substrate for a three-phase motor.

7. The coil substrate according to claim 2, wherein the plurality of coils includes a coil configured to form a U phase, a coil configured to form a V phase, and a coil configured to form a W phase such that the plurality of coils is configured to form a coil substrate for a three-phase motor.

8. A motor coil substrate, comprising:
the coil substrate of claim 1 wound into a cylindrical shape such that the first surface of the flexible substrate is positioned on an inner peripheral side of the cylindrical shape and that the second surface of the flexible substrate is positioned on an outer peripheral side of the cylindrical shape.

9. A motor, comprising:
a cylindrical yoke;
the motor coil substrate of claim 8 positioned on an inner side of the cylindrical yoke;
a rotation shaft positioned on an inner side of the motor coil substrate; and
a magnet fixed on the rotation shaft on the inner side of the motor coil substrate.

10. The coil substrate according to claim 1, wherein the flexible substrate includes an insulating resin substrate having a rectangular shape such that the coils are formed along a long side of the rectangular shape of the insulating resin substrate.

11. The coil substrate according to claim 10, wherein the plurality of coils includes a coil configured to form a U phase, a coil configured to form a V phase, and a coil configured to form a W phase such that the plurality of coils is configured to form a coil substrate for a three-phase motor.

12. A motor coil substrate, comprising:
the coil substrate of claim 10 wound into a cylindrical shape such that the first surface of the flexible substrate is positioned on an inner peripheral side of the cylindrical shape and that the second surface of the flexible substrate is positioned on an outer peripheral side of the cylindrical shape.

13. A motor, comprising:
a cylindrical yoke;
the motor coil substrate of claim 12 positioned on an inner side of the cylindrical yoke;
a rotation shaft positioned on an inner side of the motor coil substrate; and
a magnet fixed on the rotation shaft on the inner side of the motor coil substrate.

14. The coil substrate according to claim 1, wherein the plurality of coils includes a coil configured to form a U phase, a coil configured to form a V phase, and a coil configured to form a W phase such that the plurality of coils is configured to form a coil substrate for a three-phase motor.

15. The coil substrate according to claim 1, wherein the plurality of coils is formed on the flexible substrate such that the plurality of wirings formed on the first surface of the flexible substrate for one coil includes portions overlapping portions of the plurality of wirings formed on the second surface of the flexible substrate for another coil.

16. The coil substrate according to claim 1, wherein the plurality of coils is formed on the flexible substrate such that the wirings formed on the first surface of the flexible substrate are overlapping the wirings formed on the second surface of the flexible substrate through the flexible substrate.

17. The coil substrate according to claim 1, wherein the plurality of coils is formed on the flexible substrate such that the inter-wiring distance between the wirings forming the N-th coil on the first surface of the flexible substrate is larger than the inter-wiring distance between the wirings forming the N-th coil on the second surface of the flexible substrate and that the inter-wiring distance between the wirings forming the (N+1)-th coil on the first surface of the flexible substrate is larger than the inter-wiring distance between the wirings forming the (N+1)-th coil on the second surface of the flexible substrate.

18. The coil substrate according to claim 1, wherein the flexible substrate is configured to be wound into a cylindrical shape such that the first surface of the flexible substrate is positioned on an inner peripheral side of the cylindrical shape and that the second surface of the flexible substrate is positioned on an outer peripheral side of the cylindrical shape.

19. The coil substrate according to claim 1, wherein the flexible substrate has a rectangular shape and is configured to be wound in a direction of a long side of the rectangular shape with respect to an axis extending along a short side of the rectangular shape and to be formed into a cylindrical shape such that the first surface of the flexible substrate is positioned on an inner peripheral side of the cylindrical shape and that the second surface of the flexible substrate is positioned on an outer peripheral side of the cylindrical shape.

20. The coil substrate according to claim 1, wherein the flexible substrate is configured to be wound into a cylindrical shape such that the first surface of the flexible substrate is positioned on an inner peripheral side of the cylindrical shape and that the second surface of the flexible substrate is positioned on an outer peripheral side of the cylindrical shape, and each of the coils is formed on the flexible substrate such that when the flexible substrate is wound, a distance between top portions of the wirings formed on the inner peripheral side is substantially equal to a distance between bottom portions of the wirings formed on the outer peripheral side.

* * * * *